United States Patent

Kobayashi et al.

Patent Number: 5,259,348
Date of Patent: Nov. 9, 1993

[54] DIRECT INJECTION TYPE ENGINE

[75] Inventors: Tatsuo Kobayashi, Susono; Norihiko Nakamura; Kenichi Nomura, both of Mishima; Hiroaki Nihei; Koichi Nakata, both of Susono, all of Japan

[73] Assignee: Toyota Jidosha Kabushiki Kaisha, Toyota, Japan

[21] Appl. No.: 885,440

[22] Filed: May 20, 1992

[30] Foreign Application Priority Data

Jun. 20, 1991 [JP] Japan .................. 3-148605
Jun. 21, 1991 [JP] Japan .................. 3-150642

[51] Int. Cl.⁵ .............................. F02B 23/10
[52] U.S. Cl. ................................ 123/260; 123/276; 123/299; 123/302; 123/305
[58] Field of Search ........... 123/276, 260, 279, 305, 123/299, 300, 302

[56] References Cited

U.S. PATENT DOCUMENTS

| | | | |
|---|---|---|---|
| 3,452,726 | 7/1969 | Szymanski | 123/276 |
| 3,996,915 | 12/1976 | Demetrescu | 123/297 |
| 4,920,937 | 5/1990 | Sasaki et al. | 123/305 |
| 4,955,339 | 9/1990 | Sasaki et al. | 123/295 |
| 4,957,081 | 9/1990 | Ito et al. | 123/302 |
| 4,958,604 | 9/1990 | Hashimoto | 123/276 |
| 5,115,776 | 5/1992 | Ohno et al. | 123/276 |
| 5,140,958 | 8/1992 | Kobayashi et al. | 123/276 |

FOREIGN PATENT DOCUMENTS

| | | |
|---|---|---|
| 0225551 | 6/1987 | European Pat. Off. . |
| 0299385 | 1/1989 | European Pat. Off. . |
| 2424514 | 12/1975 | Fed. Rep. of Germany . |
| 3903842A1 | 9/1989 | Fed. Rep. of Germany . |
| 3913586 | 11/1989 | Fed. Rep. of Germany . |
| 51-1816 | 1/1976 | Japan . |
| 1-124042 | 8/1989 | Japan . |

Primary Examiner—Andrew M. Dolinar
Attorney, Agent, or Firm—Oliff & Berridge

[57] ABSTRACT

An internal combustion engine comprising a spark plug arranged at the center of the inner wall of the cylinder head, and a fuel injector arranged on the periphery of the inner wall of the cylinder head. A depression is formed on the top face of the piston. This depression is defined by a flat bottom wall and a pair of extended straight side walls which diverge toward the fuel injector side. Fuel is obliquely injected on the flat bottom wall of the depression from the fuel injector.

16 Claims, 22 Drawing Sheets

UNPREFERRED EXAMPLE

DIRECT INJECTION TYPE ENGINE

BACKGROUND OF THE INVENTION

1. Field of the Invention

The present invention relates to a direct injection type engine.

2. Description of the Related Art

In a known engine in which fuel is directly injected into the cylinder of the engine, a depression is formed on the top face of the piston, fuel is injected from the fuel injector toward the depression, a swirl motion, swirling about the axis of the cylinder, is created in the combustion chamber, and an ignitable air-fuel mixture is formed around the spark plug due to the swirl motion (see Japanese Unexamined Utility Model application No. 1-124042).

In this engine, however, such a swirl motion swirling about the axis of the cylinder must be created, and therefore, where such a swirl motion can not be created, the method of forming the air-fuel mixture around the spark plug by using the swirl motion can no longer be adopted. Further, in this engine, the strength of the swirl motion is changed in accordance with a change of the operating state of the engine. Therefore, if the formation of the air-fuel mixture around the spark plug relies completely on the swirl motion, a problem arises in that it is difficult to create a proper air-fuel mixture around the spark plug for all of the operating states of the engine.

SUMMARY OF THE INVENTION

An object of the present invention is to provide an engine capable of forming a proper air-fuel mixture around the spark plug, regardless of the load under which the engine is running.

Therefore, according to the present invention, there is provided an internal combustion engine comprising: a cylinder head having an inner wall; a spark plug arranged at a central portion of the inner wall of the cylinder head; fuel injection means arranged on a peripheral portion of the inner wall of the cylinder head; and a piston having a top face having a depression defined therein by a substantially flat bottom wall and a pair of substantially straight extending side walls which extend, while gradually diverging, toward the fuel injection means side from a depression end portion located beneath the spark plug, the fuel injection means injecting fuel obliquely onto the bottom wall of the depression to move the injected fuel forward along the bottom wall of the depression to the side walls of the depression, an angle between the side wall of the depression and the moving direction of the injected fuel toward the side wall of the depression becoming smaller as a flow path of the injected fuel nears an axis of a fuel injection.

The present invention may be more fully understood from the description of preferred embodiments of the invention set forth below, together with the accompanying drawings.

DESCRIPTION OF THE PREFERRED EMBODIMENTS

Figure 2:
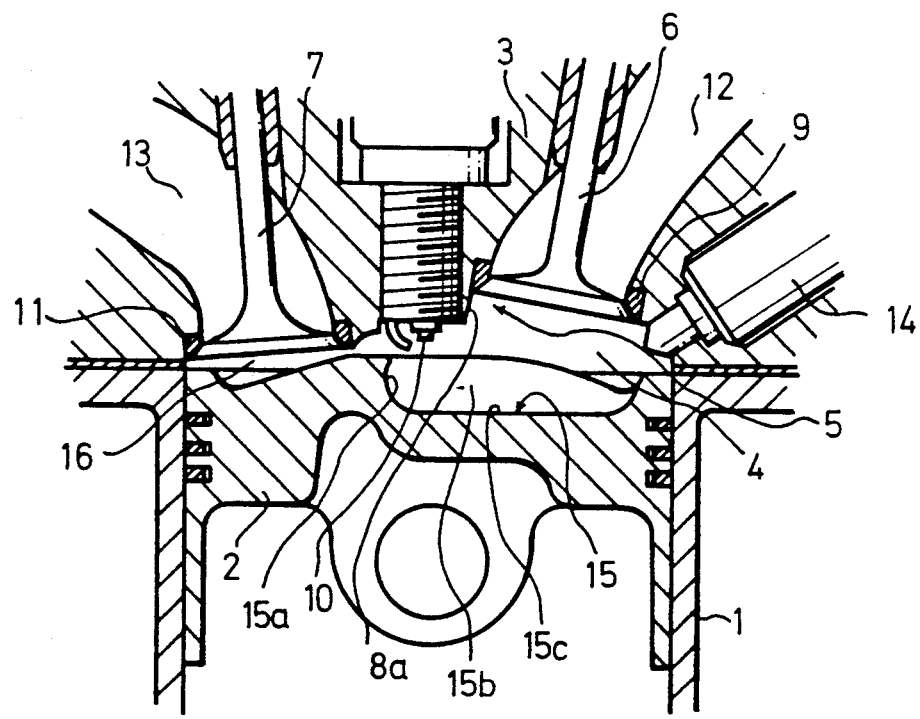
FIG. 2 is a cross-sectional side view of a two-stroke engine.
Figure 3:
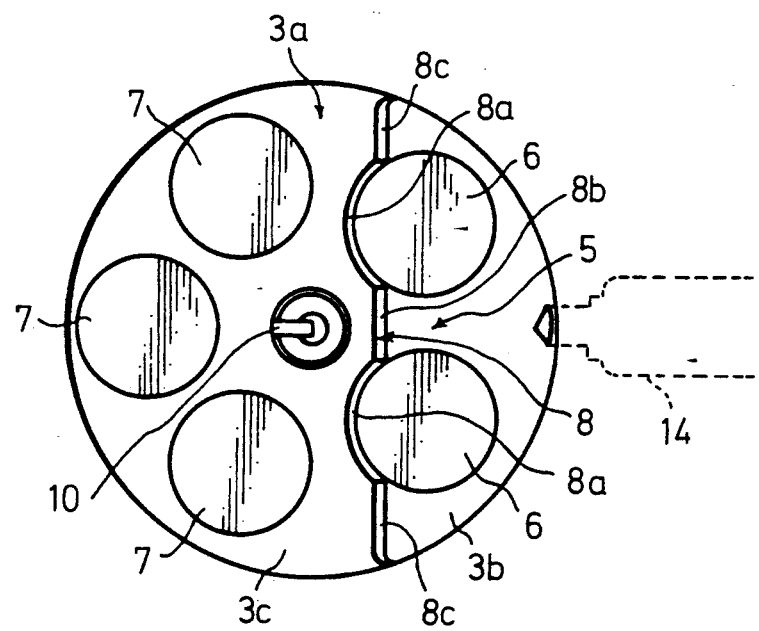
FIG. 3 is a view illustrating an inner wall of a cylinder head.

Referring to FIGS. 2 and 3, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A depression 5 is formed on the inner wall 3a of the cylinder head 3, and a pair of intake valves 6 are arranged on the inner wall portion 3b of the cylinder head 3, which forms the bottom wall of the depression 5. The inner wall portion 3c of the cylinder head 3 other than the depression 5 is substantially flat and inclined, and three exhaust valves 7 are arranged on this inner wall portion 3c of the cylinder head 3. The inner wall portions 3b and 3c of the cylinder head 3 are interconnected via the peripheral wall 8 of the depression 5. The peripheral wall 8 of the depression 5 comprises masking walls 8a arranged as close as possible to the peripheral portions of the corresponding intake valves 6 and extending archwise along the periphery of the corresponding intake valves 6, a fresh air guide wall 8b arranged between the intake valves 6, and fresh air guide walls 8c each arranged between the circumferential wall of the inner wall 3a of the cylinder head 3 and the corresponding intake valve 6. The masking walls 8a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 8a for the entire time for which the intake valve 6 is open. The fresh air guide wall 8b and the fresh air guide walls 8c are located on substantially the same plane and extend substantially in parallel to the line passing through the centers of the intake valves 6. The spark plug 10 is arranged on the inner wall portion 3c of the cylinder head 3 in such a manner that it is located at the center of the inner wall 3a of the cylinder head 3. With respect to the exhaust valves 7, no masking walls are provided to cover the openings between the exhaust valves 7 and the valve seats 11. Therefore, when the exhaust valves 7 open, the openings formed between the exhaust valves 7 and the valve seats 11 open as a whole to the inside of the combustion chamber 4.

Intake ports 12 are formed in the cylinder head 3 for the intake valves 6, and exhaust ports 13 are formed in the cylinder head 3 for the exhaust valves 7. A fuel injector 14 is arranged at the periphery of the inner wall 3a of the cylinder head 3, between the intake valves 6, and fuel is injected from the fuel injector 14 toward the combustion chamber 4.

Figure 1:
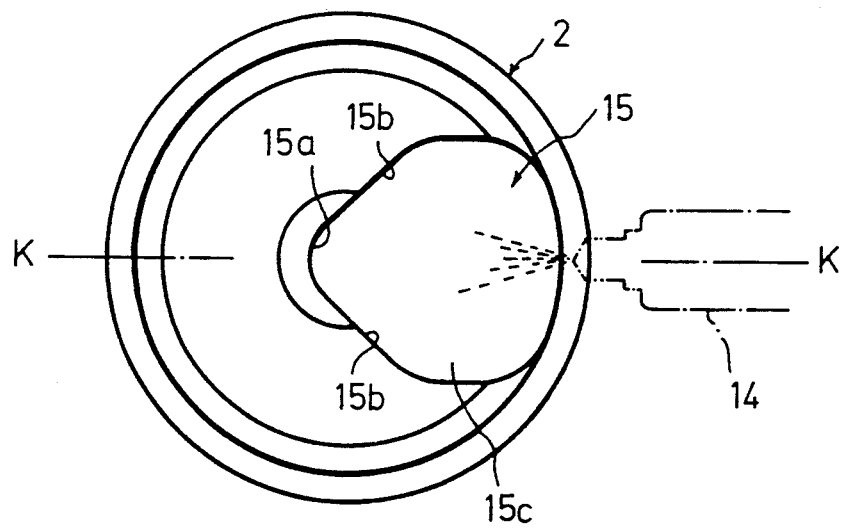
FIG. 1 is a plan view of a piston.

As illustrated in FIGS. 1 and 2, a depression 15 extending from a point beneath the spark plug 10 to a point beneath the tip portion of the fuel injector 14 is formed on the top face of the piston 2. The depression 15 is defined by a pair of substantially straight extending side walls 15b extending, while gradually diverging, toward the fuel injector side from the depression end portion 15a beneath the spark plug 10, and by a substantially flat bottom face 15c, and as illustrated in FIG. 2, the depression and portion 15a has a cross-section which is concaved in a direction opposite to the fuel injector 14. In addition, as can be seen from FIG. 1, the depression end portion 15a is formed on the vertical plane K—K including both the spark plug 10 and the fuel injector 14 therein, and the side walls 15b have a symmetrical shape with respect to the vertical plane K—K. Accordingly, the depression 15 has a symmetrical shape with respect to the vertical plane K—K. Furthermore, when the piston 2 reaches TDC as illustrated in FIG. 2, a squish area 16 is formed between the inner wall portion 3c of the cylinder head 3 and the top face portion 2a of the piston 2, which is located opposite to the depression 15 with respect to the spark plug 10.

Figure 4:
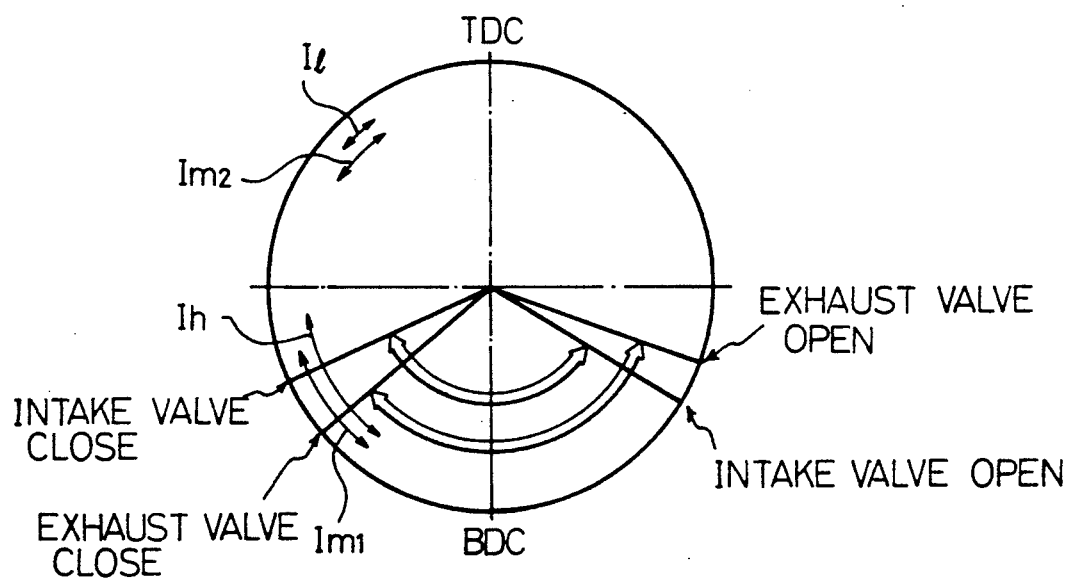
FIG. 4 is a diagram illustrating the opening time of an intake valve and an exhaust valve, and the fuel injection time.

In the embodiment illustrated in FIGS. 1 through 3, as illustrated in FIG. 4, the exhaust valves 7 open earlier than the intake valves 6, and the exhaust valves 7 close earlier than the intake valves 6. In addition, in FIG. 4, $I_l$ indicates the fuel injection time set when the engine is operating under a light load, $I_{m1}$ and $I_{m2}$ indicate the fuel injection time set when the engine is operating under a middle load, and Ih indicates the fuel injection time set when the engine is operating under a heavy load. As can be seen from FIG. 4, the fuel injection Ih under an engine high load operation is carried out when the exhaust valves 7 are almost closed, and the fuel injection $I_l$ under an engine light load operation is carried out considerably later than the fuel injection Ih under an engine heavy load operation. In addition, when the engine is operating under a middle load, the fuel injection is carried out twice. At this time, the first fuel injection $I_{m1}$ is carried out at almost the same time as the fuel injection Ih under an engine high load operation, and the second fuel injection $I_{m2}$ is carried out at almost the same time as the fuel injection $I_l$ under an engine light load operation.

Figure 5:
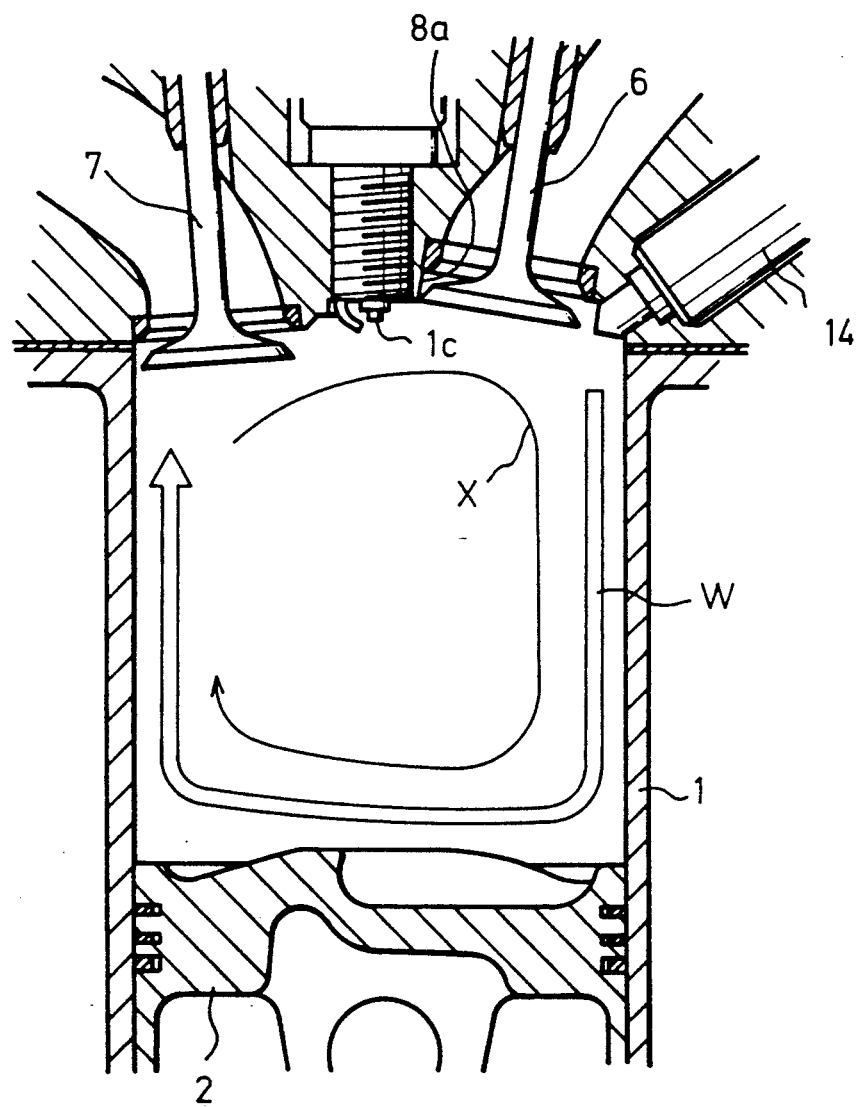
FIG. 5 is a cross-sectional side view of the two-stroke engine, illustrating a scavenging operation.

As illustrated in FIG. 5, when the intake valves 6 and the exhaust valves 7 are open, fresh air flows into the combustion chamber 4 via the intake valves 6. At this time, since the valve openings of the intake valves 6, which openings are located on the exhaust valve side, are masked by the masking walls 8a, the fresh air flows into the combustion chamber 4 from the valve openings of the intake valves 6, which openings are located on the opposite side of the masking walls 8a. Then, as illustrated by the arrow W in FIG. 5, the fresh air flows downward along the inner wall of the cylinder, located beneath the intake valves 6 and then moves forward along the top face of the piston 2 and flows upward along the inner wall of the cylinder, located beneath the exhaust valves 7. Thus, the fresh air flows within the combustion chamber 4 in the form of a loop. The burned gas in the combustion chamber 4 is discharged via the exhaust valves 7 by the air stream W flowing in the form of a loop manner, and a swirl motion X swirling in a vertical plane is created in the combustion chamber 4 by the airstream W flowing in the form of a loop. Then, the piston 2 passes through the bottom dead center (BDC) and starts to move upward. Thereafter, the injection of fuel by the fuel injector 14 is started.

Figure 6:
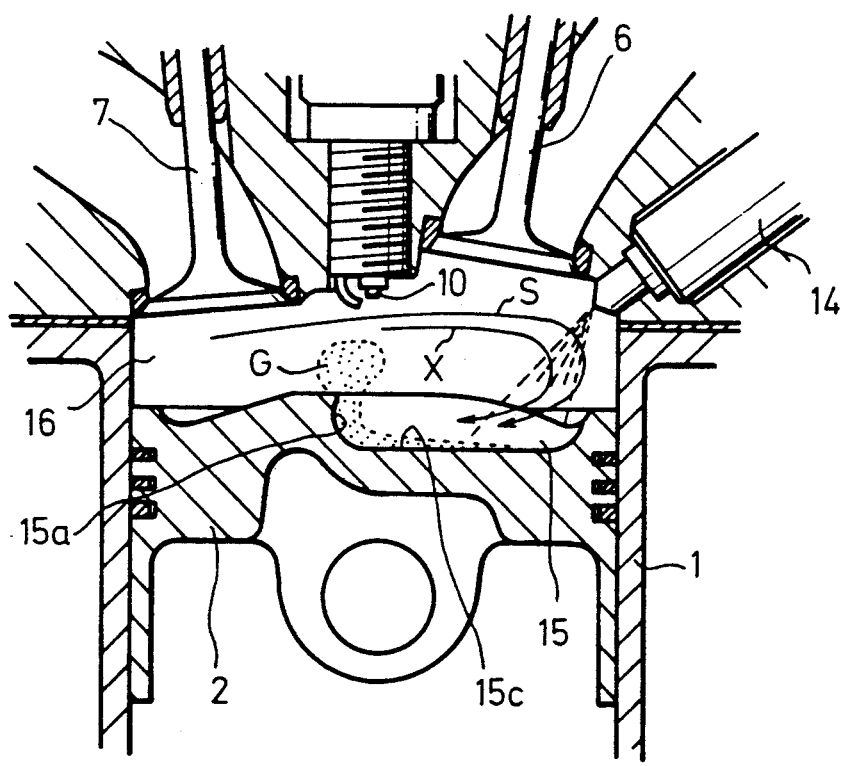
FIG. 6 is a cross-sectional side view of the two-stroke engine, illustrating the fuel injection under an engine light load operation and the second fuel injection under an engine middle load operation.
Figure 7:
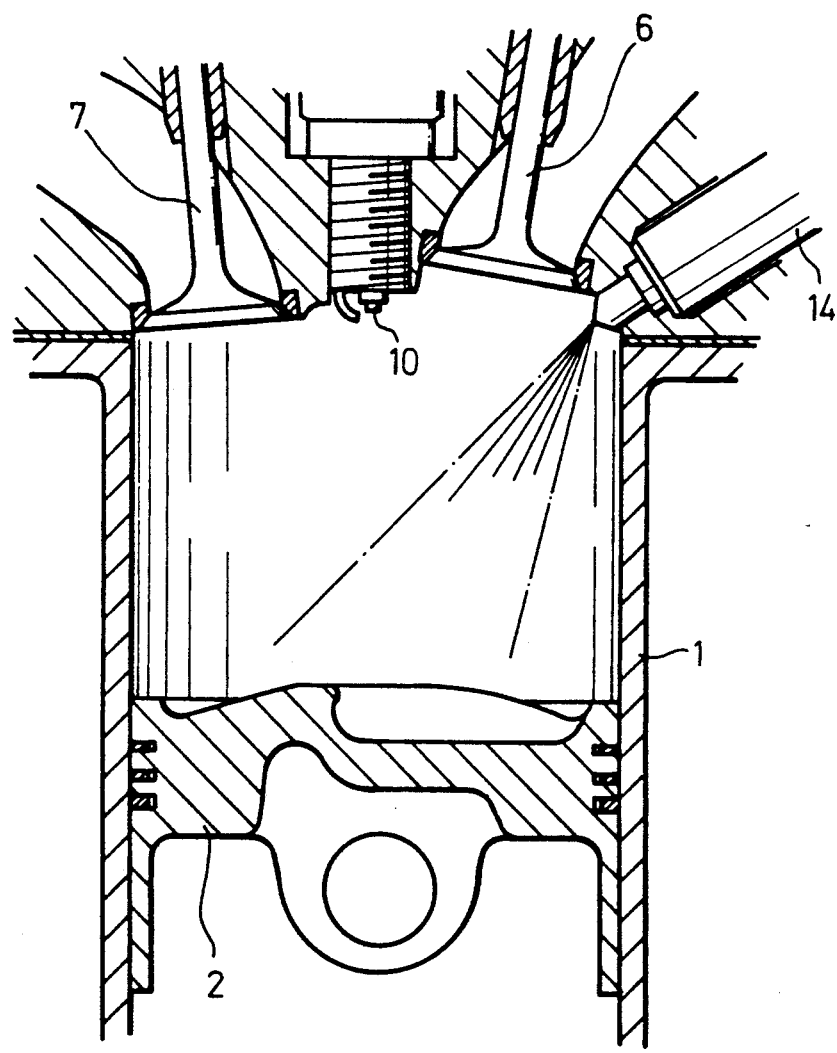
FIG. 7 is a cross-sectional side view of the two-stroke engine, illustrating the first fuel injection under an engine middle load operation and the fuel injection under an engine high load operation.

Next, the fuel injections carried out when the engine is operating under a light load, a middle load and a heavy load will be described with reference to FIGS. 6 through 9. FIG. 6 illustrates the fuel injection $I_l$ under an engine light load operation and the second fuel injection $I_{m2}$ under an engine middle load operation, and FIG. 7 illustrates the first fuel injection $I_{m1}$ under an engine middle load operation and the fuel injection Ih under an engine high load operation.

At the time of the fuel injection $I_l$ under an engine light load operation and the second fuel injection $I_{m2}$ under an engine middle load operation, fuel is obliquely injected toward the bottom wall 15c along the vertical plane K—K from the fuel injector 14. This injected fuel moves forward toward the depression end portion 15a along the side walls 15b, after impinging upon the bottom wall 15c.

Next, the behavior of the injected fuel at this time will be described with reference to FIG. 8.

Figure 8:
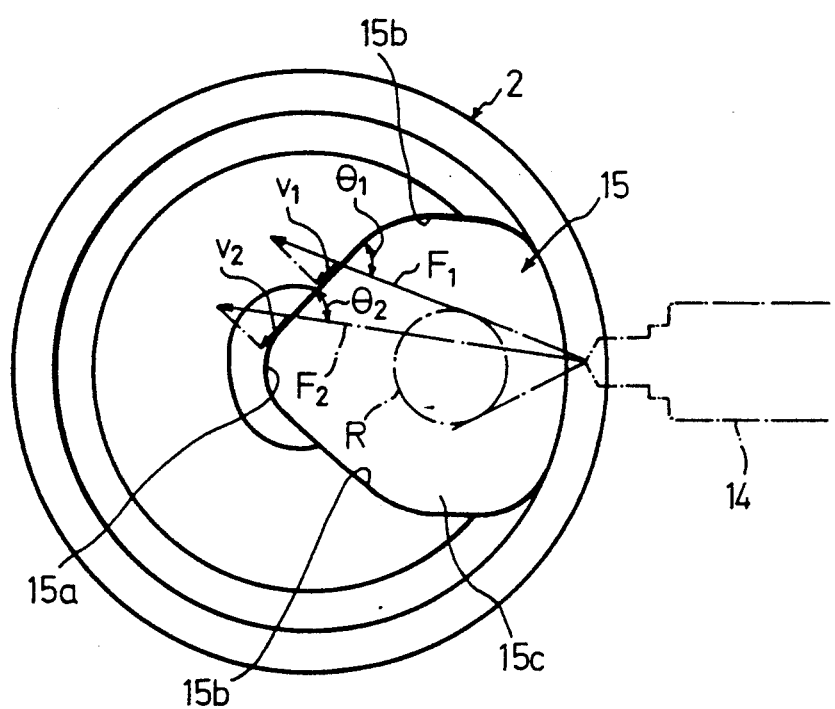
FIG. 8 is a plan view of the piston, which is the same as that in FIG. 1.

In FIG. 8, the dashed and dotted line R indicates the region in which the injected fuel impinges on the bottom wall 15c, and the arrows $F_1$ and $F_2$ indicate the representative two blow paths of the injected fuel. As illustrated in FIG. 8, the injected fuel flows $F_1$ and $F_2$ are moved forward in the injecting direction due to the inertia forces thereof, even after impinging upon the bottom wall 15c, and these injected fuel flows $F_1$ and $F_2$ are moved forward toward the depression and portion 15a along the side walls 15b after reaching the side walls 15b. In this case, since the side walls 15b extend substantially straight from the depression end portion 15a toward the fuel injector side, the angle $\theta_1$, $\theta_2$ between the side wall 15b and the moving direction of the injected fuel $F_1$, $F_2$ toward the side wall 15b becomes small as the flow path of the injected fuel $F_1$, $F_2$ approaches the central axis of the fuel injection. Accordingly, the flow velocity $V_1$, $V_2$ of the injected fuel $F_1$, $F_2$ when the injected fuel $F_1$, $F_2$ begins to move along the side wall 15b becomes higher as the flow path of the injected fuel $F_1$, $F_2$ approaches the central axis of the fuel injection.

Figure 9:
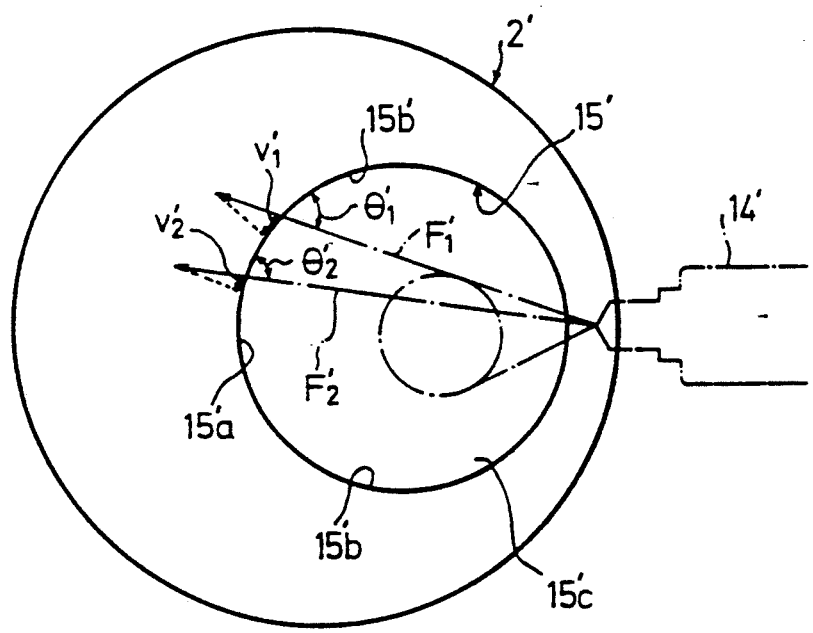
FIG. 9 is a plan view of the piston, illustrating an unpreferable example.
Figure 10:
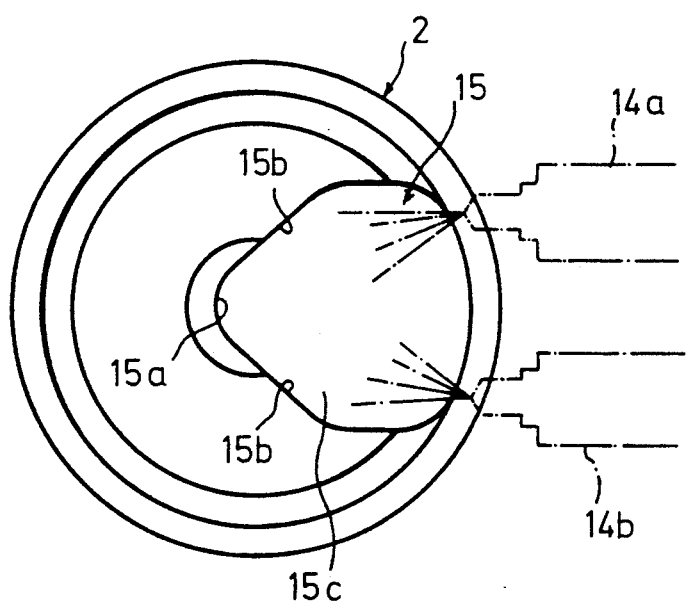
FIG. 10 is a plan view of a second embodiment of a piston.
Figure 11:
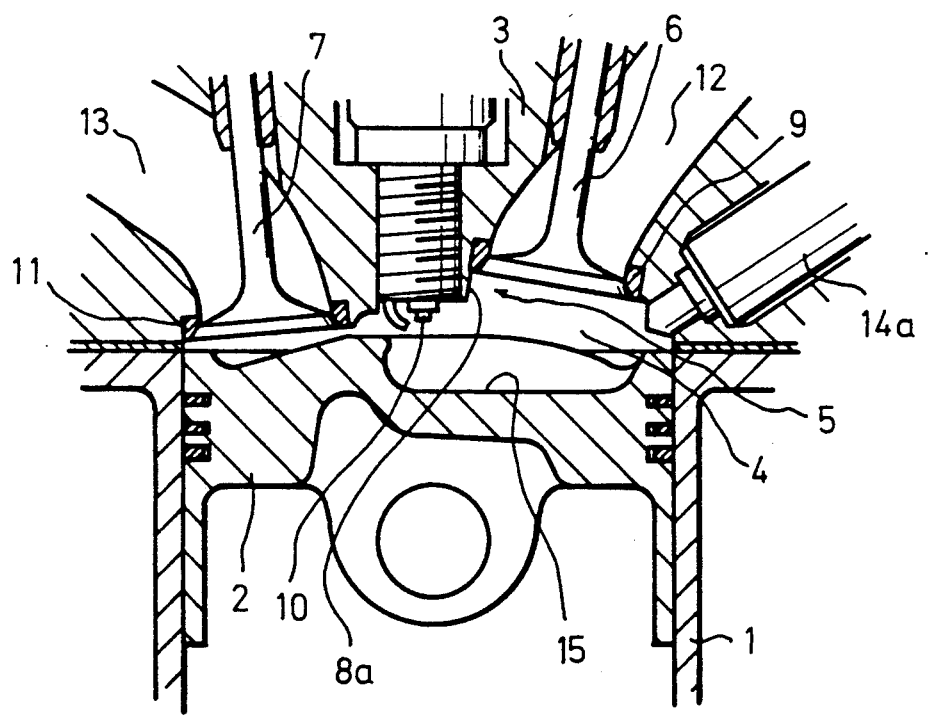
FIG. 11 is a cross-sectional side view of a two-stroke engine.
Figure 12:
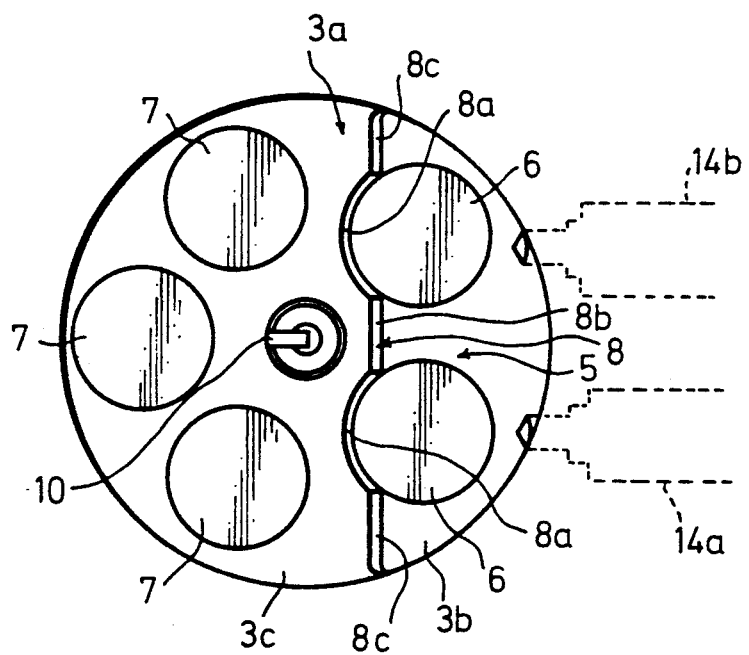
FIG. 12 is a view illustrating an inner wall of a cylinder head.

Conversely, as illustrated in FIG. 9, where the depression 15' formed on the top face of the piston 2' is formed such that it has a circular contour shape, and where fuel is injected toward the flat bottom wall 15c' of the depression 15' from the fuel injector 14', the angle $\theta_1'$, $\theta_2'$ between the side wall 15b' and the moving direction of the injected fuel $F_1'$, $F_2'$ toward the side wall 15b' becomes large as the flow path of the injected fuel $F_1'$, $F_2'$ approaches the central axis of the fuel injection. Accordingly, the flow velocity $V_1'$, $V_2'$ of the injected fuel $F_1'$, $F_2'$ when the injected fuel $F_1$, $F_2$ begins to move along the side wall 15b' becomes lower as the flow path of the injected fuel $F_1'$, $F_2'$ approaches the central axis of the fuel injection. If the relationship $V_1' > V_2'$ exists, however, as in the example illustrated in FIG. 9, the entire fuel or the air-fuel mixture, flowing along the side walls 15b' reaches the depression end portion 15a' at almost the same time. Then, the fuel or the air-fuel mixture moves upward along the depression end portion 15a' and creates an air-fuel mixture around the spark plug 10. Accordingly, in this case, the air-fuel mixture is formed around the spark plug 10 by the entire fuel injected by the fuel injector 14 regardless of the amount of injected fuel, and thus, in this case, the concentration of the air-fuel mixture formed around the spark plug 10 cannot be controlled by any method other than a method of controlling the amount of fuel injected by the fuel injector 14. Accordingly, for example, where the positions of the depression 15' and the spark plug 10 are determined so that an optimum air-fuel mixture can be formed around the spark plug 10 when the amount of the injected fuel is small, the air-fuel mixture formed around the spark plug 10 becomes excessively rich when the amount of fuel to be injected is increased. As a result, a good ignition of the air-fuel mixture by the spark plug cannot be obtained, and even if the air-fuel mixture is ignited, a large amount of unburned HC and CO will be produced.

Conversely, if the relationship $V_1 > V_2$ as illustrated in FIG. 8 exists, when the injected fuel $F_2$ reaches the depression end portion 15a, the injected fuel $F_1$ is still in the process of moving forward toward the depression end portion 15a. Accordingly, a time difference arises between the time at which the injected fuel $F_1$ reaches the depression end portion 15a and the time at which the injected fuel $F_2$ reaches the depression end portion 15a. If such a time difference arises, the air-fuel mixture formed around the spark plug 10 gradually becomes rich with an elapse of time. Accordingly, in this case, the concentration of the air-fuel mixture formed around the spark plug 10 at the time of ignition can be controlled by controlling the time from the fuel injection time to the ignition time, even if the amount of fuel to be injected is maintained constant. Namely, it is possible to always form an optimum air-fuel mixture around the spark plug 10 at the time of ignition by controlling the ignition time or the injection time so that the air-fuel mixture having an optimum concentration can be formed around the spark plug 10 at the time of ignition. Accordingly, if the depression 15 having a shape as illustrated in FIG. 8 is used, a good ignition by the spark plug 10 can be obtained regardless of the amount of fuel to be injected.

As mentioned above, the injected fuel flows on the bottom wall 15c toward a region beneath the spark plug 10. In addition, the swirl motion X created in the combustion chamber 4 as illustrated in FIG. 5 is gradually attenuated, and the radius of the swirl motion X becomes smaller as the piston 2 moves upward. This swirl motion X becomes the swirl motion X, which flows along the bottom wall 15c as illustrated in FIG. 6, when the piston 2 approaches TDC. The swirl motion X provides the force which causes the injected fuel to move to the region beneath the spark plug 10, and further, when the piston 2 moves closer to TDC, the squish flow is spouted from the squish area 16 as illustrated by the arrow S in FIG. 6, and this squish flow S also flows along the bottom wall 15c. Consequently, this squish flow S also provides a force which causes the injected fuel to move to the region beneath the spark plug 10. Furthermore, the fuel moving to the region beneath the spark plug 10 along the bottom wall 15c is atomized by the swirl motion X and the squish flow S, and thus an ignitable air-fuel mixture which has been fully atomized is collected around the spark plug 10.

At the time of the fuel injection $I_h$ under an engine heavy load operation and the first fuel injection $I_{m1}$ under an engine middle load operation, the injection of fuel is started when the position of the piston 2 is low, as illustrated in FIG. 7. Accordingly, at this time, since the injected fuel impinges upon the top face of the piston 2 over the wide range thereof, the injected fuel is properly spread in the combustion chamber 4. When the engine is operating under a middle load, a lean air-fuel mixture is formed in the combustion chamber 4 by this first fuel injection $I_{m1}$ and is burned by an ignition source created by the air-fuel mixture formed around the spark plug 10 by the second fuel injection $I_{m2}$. When the engine is operating under a heavy load, the air-fuel mixture formed in the combustion chamber 4 by the fuel injected as illustrated in FIG. 7 is ignited by the spark plug 10.

Figure 13:
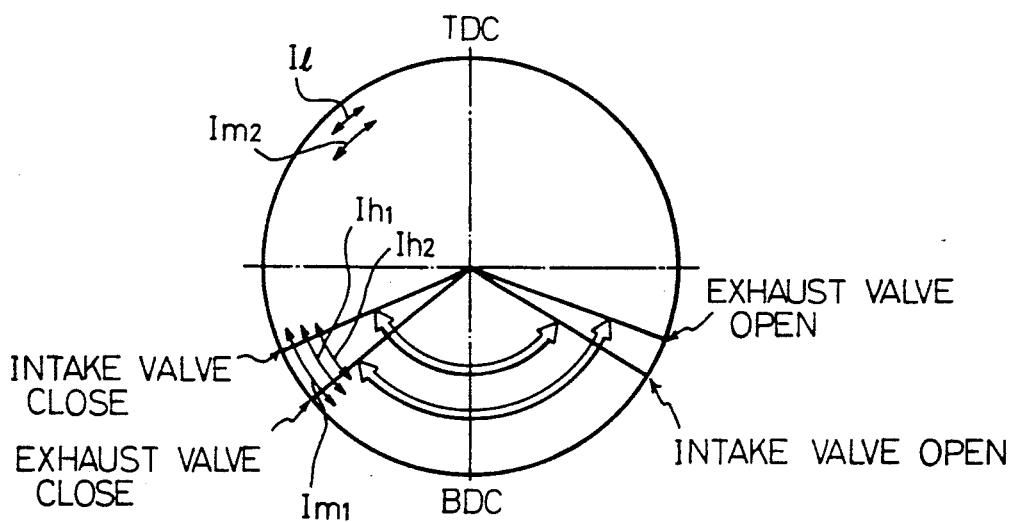
FIG. 13 is a diagram illustrating the opening time of an intake valve and an exhaust valve, and the fuel injection time.
Figure 14:
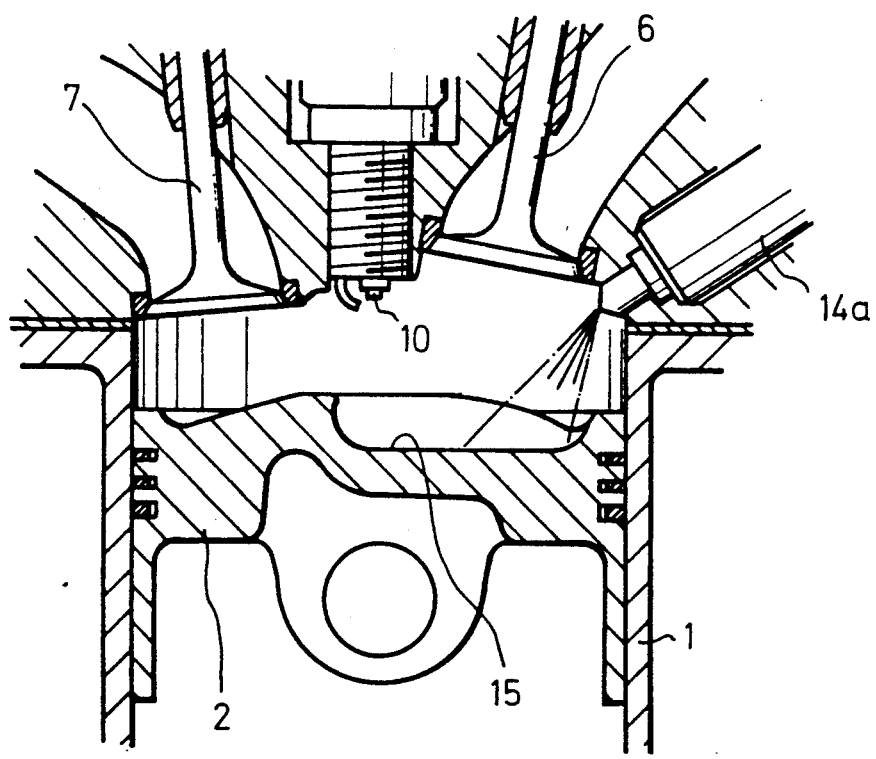
FIG. 14 is a cross-sectional side view of the two-stroke engine, illustrating the fuel injection under an engine light load operation and the second fuel injection under an engine middle load operation.
Figure 15:
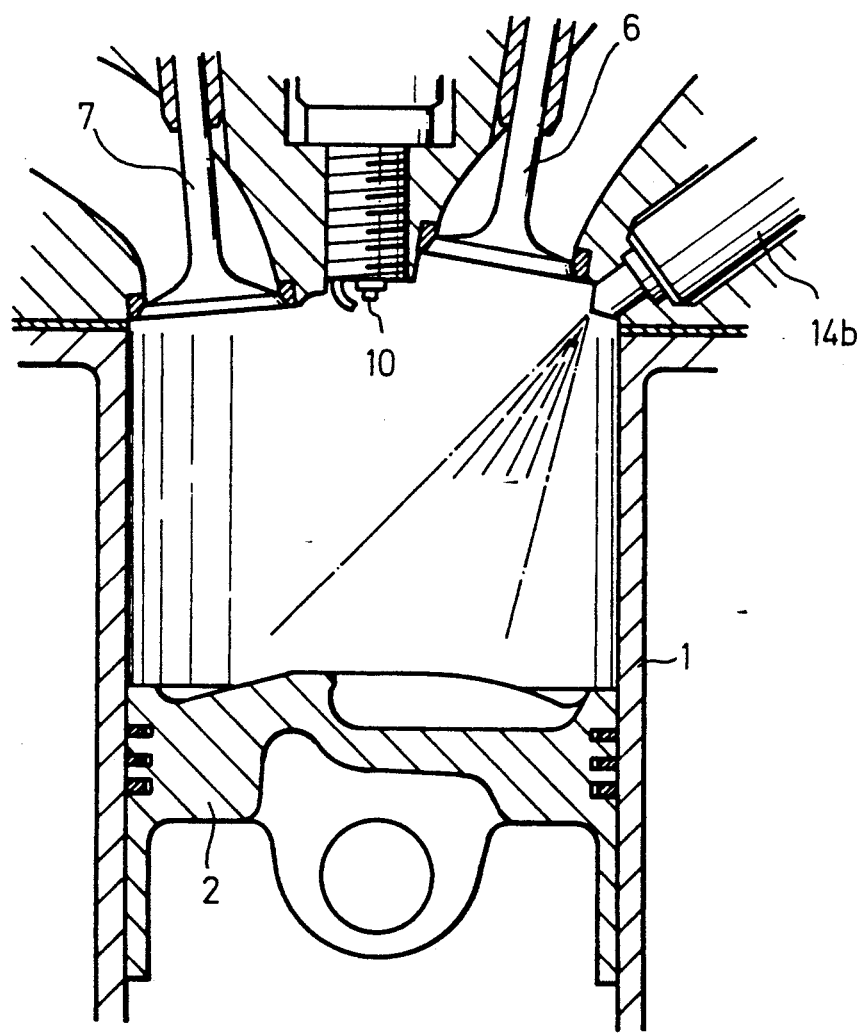
FIG. 15 is a cross-sectional side view of the two-stroke engine, illustrating the first fuel injection under an engine middle load operation.
Figure 16:
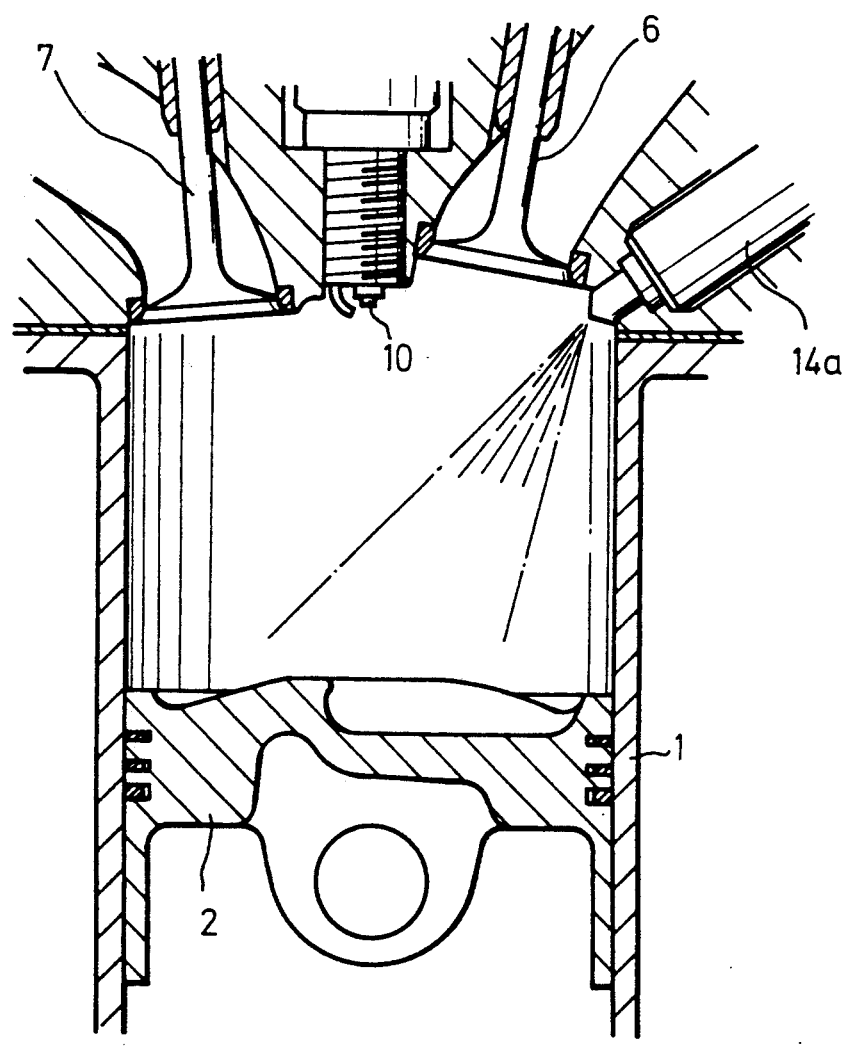
FIG. 16 is a cross-sectional side view of the two-stroke engine, illustrating the fuel injection under an engine high load operation.
Figure 17:
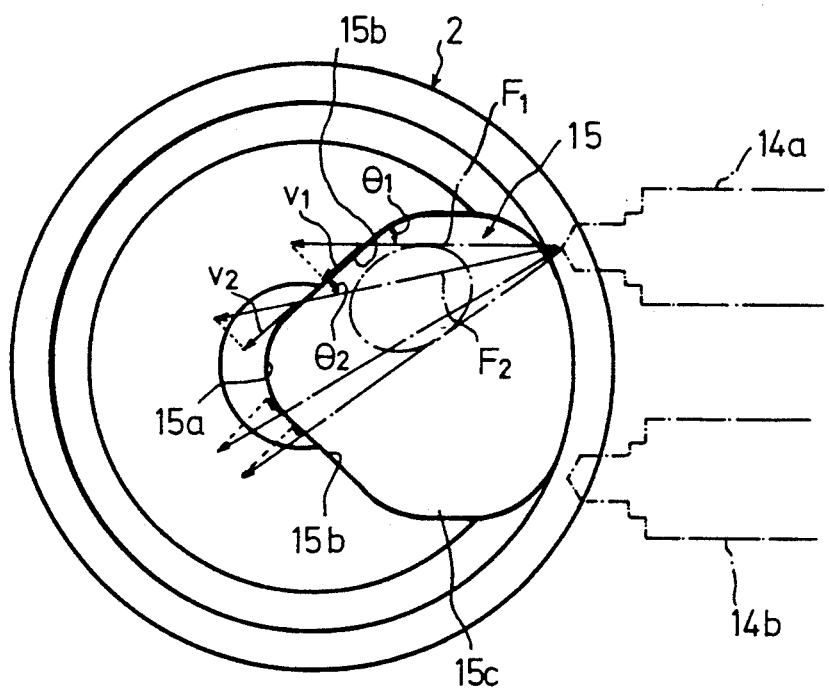
FIG. 17 is a plan view of the piston, which is the same as that in FIG. 10.

FIGS. 10 through 16 illustrate a second embodiment. In this embodiment, a pair of fuel injectors, i.e., a first fuel injector 14a and a second fuel injector 14b are arranged at the peripheral portion of the cylinder head inner wall 3a at a position near the corresponding intake valves 6, and as can been seen from FIG. 10, fuels are injected by these fuel injectors 14a, 14b toward the axis of the cylinder of the engine. As illustrated in FIG. 13, the fuel injection times under an engine light load operation, an engine middle load operation and an engine heavy load operation in the second embodiment are the same as those in the embodiment illustrated in FIGS. 1 through 4, but in the second embodiment, the fuel injection $I_l$ under an engine light load operation and the second fuel injection $I_{m2}$ under an engine middle load operation are carried out by the first fuel injector 14a as illustrated in FIG. 14, and the first fuel injection $I_{m1}$ under an engine middle load operation is carried out by the second fuel injector 14b as illustrated in FIG. 15. In addition, as illustrated in FIG. 16, the fuel injections $Ih_1$ and $Ih_2$ under an engine high load operation are carried out by both the first fuel injector 14a and the second fuel injector 14b (not shown in FIG. 16).

In the second embodiment, at the time of the fuel injection $I_l$ under an engine light load operation and the second fuel injection $I_{m2}$ under an engine middle load operation, fuel is obliquely injected toward the bottom wall 15b from the first fuel injector 14a. This injected fuel moves forward toward the depression end portion 15a along the side walls 15b after impinging upon the bottom wall 15c. Also in the second embodiment, since the side walls 15b extend substantially straight from the depression end portion 15a toward the fuel injectors side, the angle $\theta_1$, $\theta_2$ between the side wall 15b and the moving direction of the injected fuel $F_1$, $F_2$ toward the side wall 15b becomes smaller as the flow path of the injected fuel $F_1$, $F_2$ approaches the central axis of the fuel injection. Accordingly, the flow velocity $V_1$, $V_2$ of the injected fuel $F_1$, $F_2$ when the injected fuel $F_1$, $F_2$ begins to move along the side wall 15b becomes higher as the flow path of the injected fuel $F_1$, $F_2$ approaches the central axis of the fuel injection. Accordingly, a difference arises between the time at which the injected fuel $F_1$ reaches the depression end portion 15a and the time at which the injected fuel $F_2$ reaches the depression end portion 15a, and thus it is possible to create an air-fuel mixture having an optimum concentration around the spark plug 10 at the time of ignition.

Figure 18:
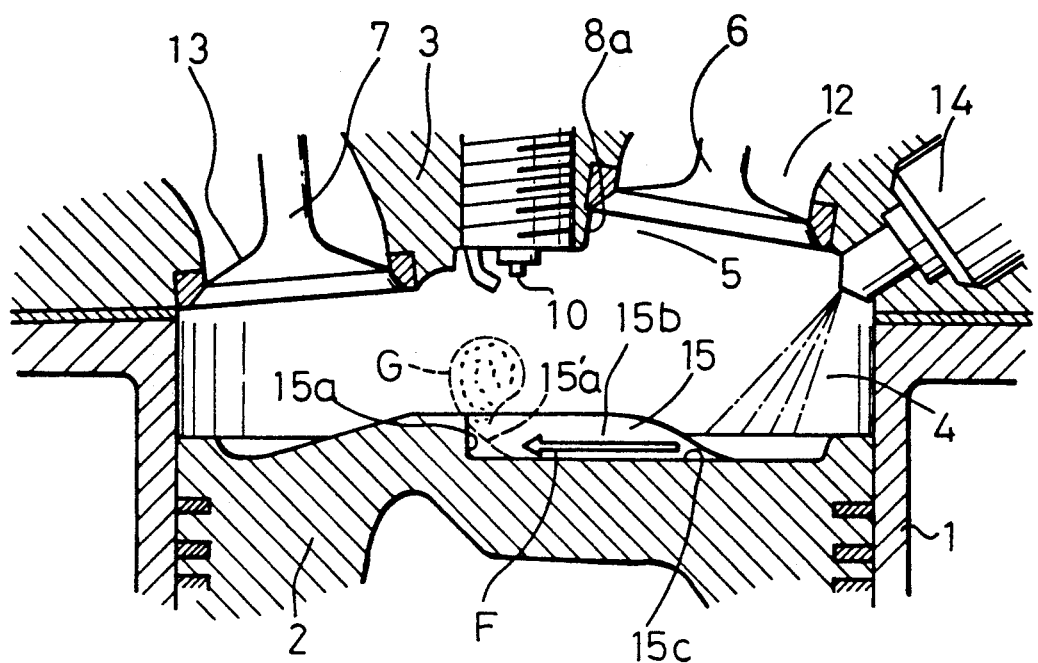
FIG. 18 is a cross-sectional side view of a third embodiment of a two-stroke engine.
Figure 19:
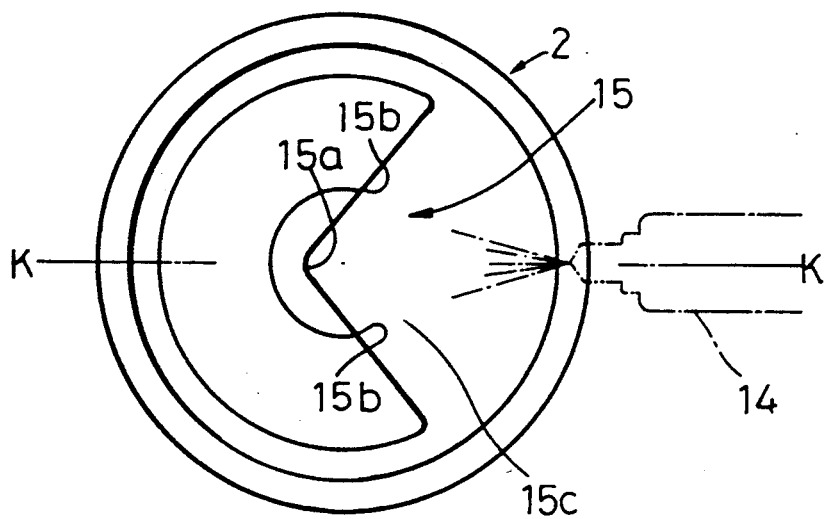
FIG. 19 is a plan view of a piston.
Figure 20:
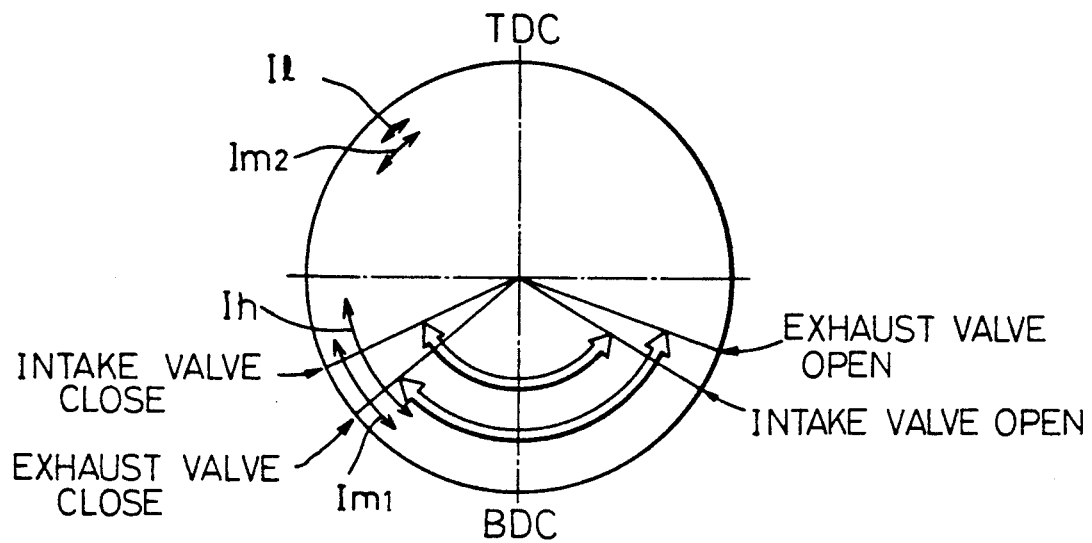
FIG. 20 is a diagram illustrating the opening time of an intake valve and an exhaust valve, and the fuel injection time.
Figure 21:
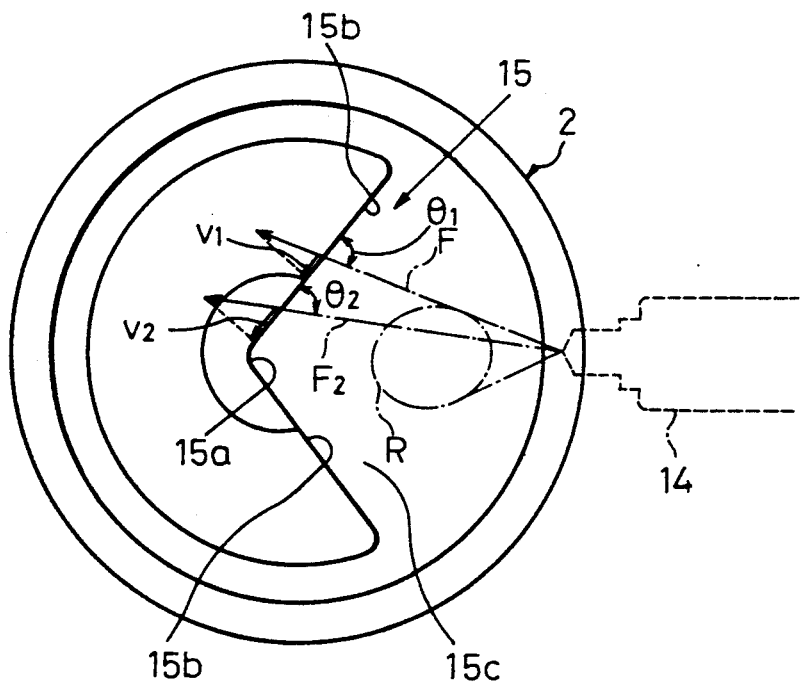
FIG. 21 is a plan view of the piston, which is the same as that in FIG. 19.

FIGS. 18 through 21 illustrate a third embodiment, which modifies the first embodiment illustrated in FIGS. 1 through 8. In this third embodiment, the single fuel injector 14 is arranged on the inner wall of the cylinder head 3, and as can be seen from FIG. 20, the injection time of the fuel injector 14 in the third embodiment is the same as that in the first embodiment. As illustrated in FIG. 19, also in the third embodiment, the side walls 15b extend substantially straight from the depression end portion 15a toward the fuel injector side. Accordingly, as can be seen from FIG. 21, the angle $\theta_1$, $\theta_2$ between the side wall 15b and the moving direction of the injected fuel $F_1$, $F_2$ toward the side wall 15b becomes smaller as the flow path of the injected fuel $F_1$, $F_2$ approaches the central axis of the fuel injection. Accordingly, the flow velocity $V_1$, $V_2$ of the injected fuel $F_1$, $F_2$ when the injected fuel $F_1$, $F_2$ begins to move along the side wall 15b becomes higher as the flow path of the injected fuel $F_1$, $F_2$ approaches the central axis of the fuel injection. Accordingly, a difference arises between the time at which the injected fuel $F_1$ reaches the depression end portion 15a and the time at which the injected fuel $F_2$ reaches the depression end portion 15a, and thus it is possible to create an air-fuel mixture having an optimum concentration around the spark plug 10 at the time of ignition.

In addition, in the third embodiment, the depression end portion 15a extends substantially straight upward from the bottom wall 15c at a right angle. Accordingly, the injected fuel flowing along the bottom wall 15c impinges against the depression end portion 15a, and thereby completely loses all velocity.

In this case, if the depression end portion 15a has an arc shaped cross-section as illustrated by the broken line 15'a in FIG. 18, the injected fuel flowing along the bottom wall 15c, as illustrated by the arrow F, is guided by the depression end portion 15a' and the flow direction thereof changed upward without being decelerated. Then, the injected fuel is spouted upward from the upper edge of the depression end portion 15a' and adheres to the spark plug 10. If the injected fuel adheres to the spark plug 10, however, the fuel is carbonized on the spark plug 10, and as a result, since an ignition current leaks via the carbonized fuel, it is impossible to ignite the air-fuel mixture.

Nevertheless, in the third embodiment, since the depression end portion 15a extends upward from the bottom wall 15c at a right angle, the injected fuel completely loses all velocity when impinging against the depression end portion 15a as mentioned above. Accordingly, since there is no danger that the injected fuel will adhere to the spark plug 10, a good ignition can be obtained. In addition, since the injected fuel flowing along the bottom wall 15c comes into front collision with the depression end portion 15a, the injected fuel is atomized due to the collision, and the atomized fuel is pushed upward by the following atomized fuel as illustrated by G in FIG. 18. As a result, an ignitable air-fuel mixture, which has been fully atomized, is formed around the spark plug 10.

Figure 22:
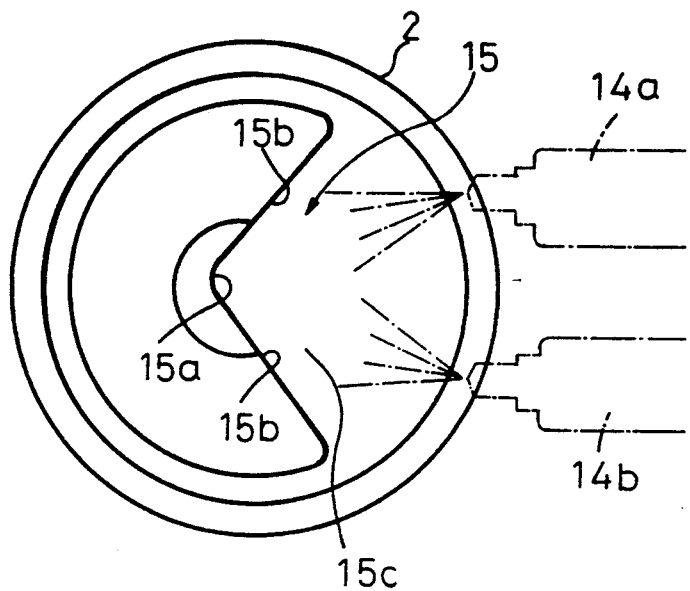
FIG. 22 is a plan view of a fourth embodiment of a piston.

FIGS. 22 through 25 illustrate a fourth embodiment, which modifies the second embodiment illustrated in FIGS. 10 through 17. In this fourth embodiment, the first fuel injector 14a and the second fuel injector 14b are arranged on the inner wall of the cylinder head 3, and as can be seen from FIG. 24, the injection time of the fuel injectors 14a and 14b in the fourth embodiment is the same as that in the second embodiment. As illustrated in FIG. 22, also in this fourth embodiment, the side walls 15b extend substantially straight from the depression end portion 15a toward the fuel injectors side. Accordingly, as can be seen from FIG. 25, the angle $\theta_1$, $\theta_2$ between the side wall 15b and the moving direction of the injected fuel $F_1$, $F_2$ toward the side wall 15b becomes smaller as the flow path of the injected fuel $F_1$, $F_2$ approaches the central axis of the fuel injection. Accordingly, the flow velocity $V_1$, $V_2$ of the injected fuel $F_1$, $F_2$ when the injected fuel $F_1$, $F_2$ begins to move along the side wall 15b becomes higher as the flow path of the injected fuel $F_1$, $F_2$ approaches the central axis of the fuel injection. Accordingly, a difference arises between the time at which the injected fuel $F_1$ reaches the depression end portion 15a and the time at which the injected fuel $F_2$ reaches the depression end portion 15a, and thus it is possible to create an air-fuel mixture having an optimum concentration around the spark plug 10 at the time of ignition.

Figure 23:
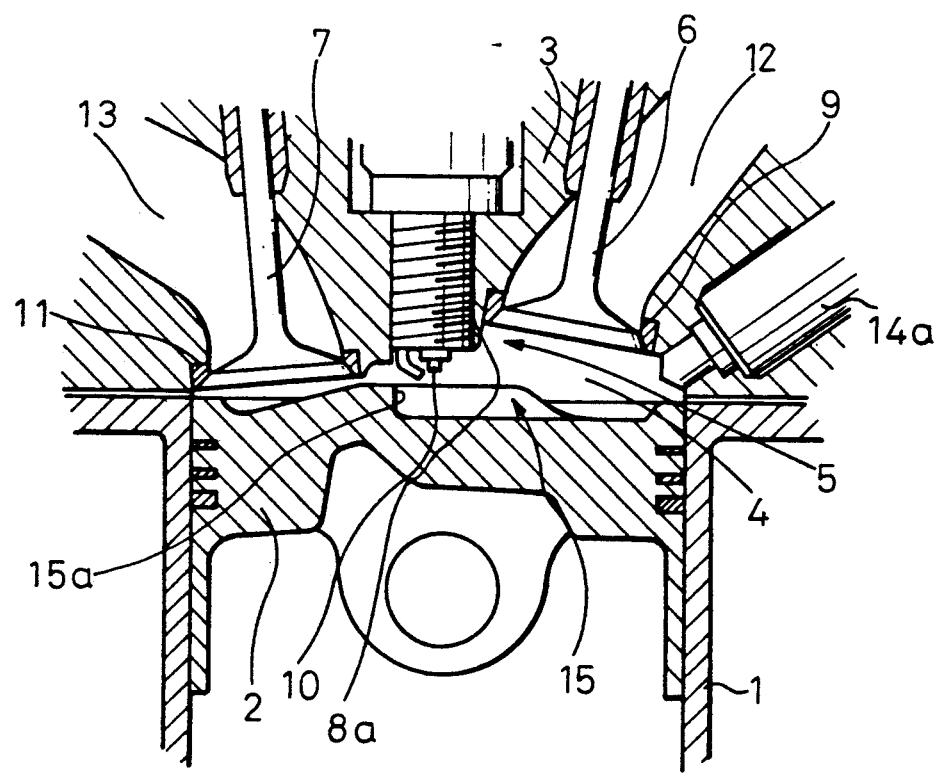
FIG. 23 is a cross-sectional side view of a two-stroke engine.
Figure 24:
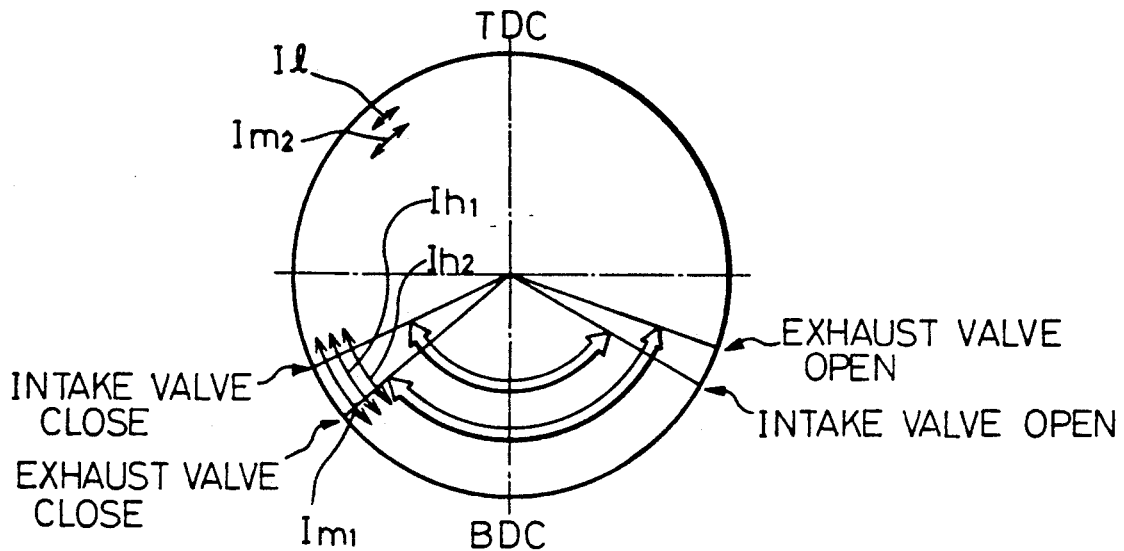
FIG. 24 is a diagram illustrating the opening time of an intake valve and an exhaust valve, and the fuel injection time.
Figure 25:
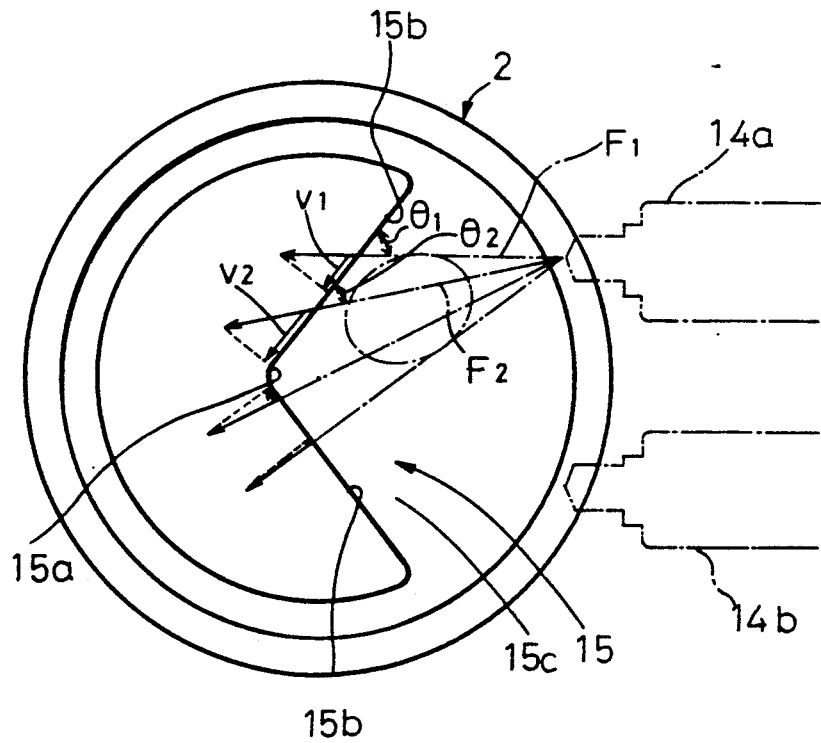
FIG. 25 is a plan view of the piston, which is the same as that in FIG. 22.

In addition, also in the fourth embodiment, the depression end portion 15a extends substantially straight upward from the bottom wall 15c at a right angle, as illustrated in FIG. 23. Accordingly, the injected fuel flowing along the bottom wall 15c comes into front collision with the depression end portion 15a and completely loses all velocity. Thus, as mentioned above, a good ignition can be obtained.

FIGS. 22 and 23 illustrate a fifth embodiment and a sixth embodiment, respectively, which further modify the third embodiment.

Figure 26:
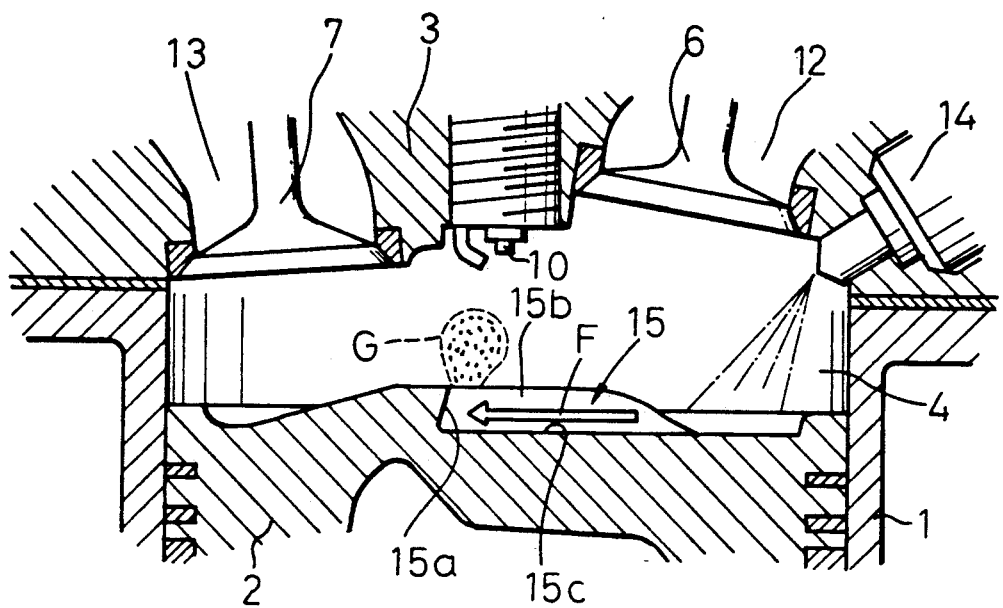
FIG. 26 is a cross-sectional side view of a fifth embodiment of a two-stroke engine.
Figure 27:
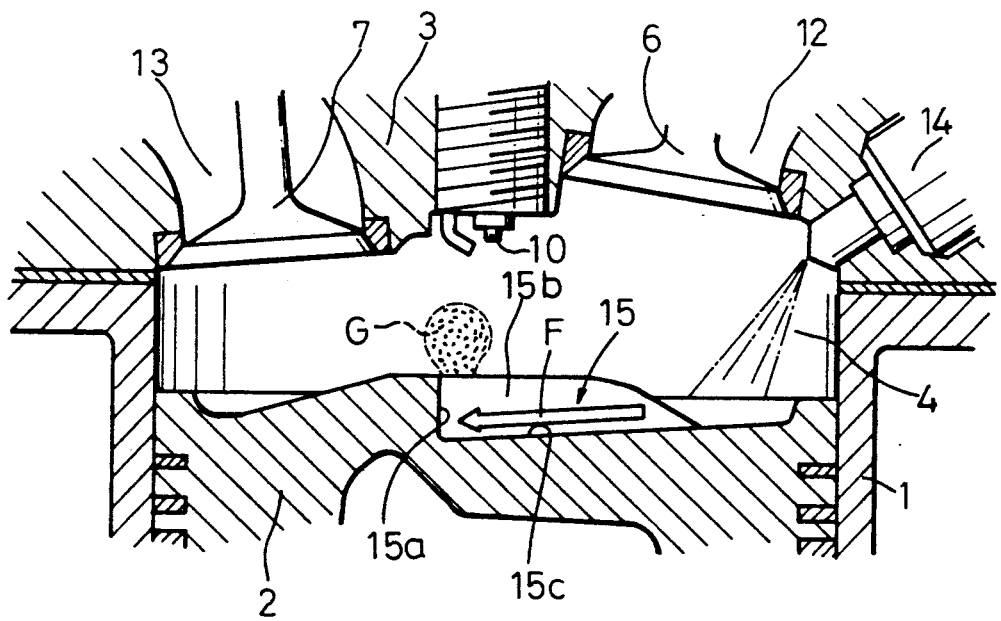
FIG. 27 is a cross-sectional side view of a sixth embodiment of a two-stroke engine.

In the fifth embodiment illustrated in FIG. 26, the depression end portion 15a extends upward from the horizontally extending bottom wall 15c at an acute angle. Conversely, in the sixth embodiment illustrated in FIG. 27, the bottom wall 15c gradually descends toward a region beneath the spark plug 10, and the depression end portion 15a extends substantially vertically from the bottom wall 15c. Accordingly, also in the sixth embodiment illustrated in 27, the depression end portion 15a extends upward from the bottom wall 15c at an acute angle.

If the depression end portion 15a extends upward from the bottom wall 15c at an acute angle, when the injected fuel flowing along the bottom wall 15c as illustrated by the arrow F impinges against the depression end portion 15a, a slightly downward velocity is given to the injected fuel. Namely, no upward velocity is given to the injected fuel at all. Accordingly, it is possible to further prevent the injected fuel from adhering to the spark plug 10, and thus the ignition by the spark plug 10 is further promoted. Note that, also in this case, since the injected fuel atomized by the collision operation is pushed upward by the following atomized fuel, a fully atomized air-fuel mixture is formed around the spark plug 10.

The present invention has been described on the basis of a case where the present invention is applied to a direct injection type two stroke engine, but the present invention may be applied to a direct injection type four stroke engine.

According to the present invention, in an engine in which fuel is injected into the depression formed on the top face of the piston, it is possible to constantly form an air-fuel mixture having an optimum concentration around the spark plug at the time of ignition.

While the invention has been described by reference to specific embodiments chosen for purposes of illustration, it should be apparent that numerous modifications could be made thereto by those skilled in the art without departing from the basic concept and scope of the invention.

We claim:

1. An internal combustion engine comprising:
a cylinder head having an inner wall;
a spark plug arranged at the center of the inner wall of said cylinder head;
fuel injection means arranged on a peripheral portion of the inner wall of said cylinder head; and
a piston having a top face having a depression defined by a substantially flat bottom wall and a pair of substantially straight extending side walls which extend, while gradually diverging, toward said fuel injection means side from a depression end portion located beneath said spark plug, said fuel injection means injecting fuel obliquely onto the bottom wall of said depression to move the injected fuel forward along the bottom wall of said depression to the side walls of said depression, an angle between the side wall of said depression and the moving direction of the injected fuel toward the side wall of said depression becoming smaller as a flow path of the injected fuel nears an axis of fuel injection.

2. An internal combustion engine according to claim 1, wherein said depression end portion is located in a vertical plane passing through both said spark plug and said fuel injection means and the side walls of said depression are symmetrically arranged with respect to said vertical plane.

3. An internal combustion engine according to claim 1, wherein said fuel injection means comprises a pair of fuel injectors, and said depression end portion is located in a vertical plane passing through both said spark plug and between said fuel injectors, the side walls of said depression being symmetrically arranged with respect to said vertical plane.

4. An internal combustion engine according to claim 1, wherein said depression end portion extends upward from the bottom wall of said depression.

5. An internal combustion engine according to claim 4, wherein said depression end portion has a vertical cross-section which is concave in the direction opposite to said fuel injection means.

6. An internal combustion engine according to claim 4, wherein said depression end portion extends substantially straight upward from the bottom wall of said depression at a right angle.

7. An internal combustion engine according to claim 4, wherein said depression end portion extends substantially straight upward from the bottom wall of said depression at an acute angle.

8. An internal combustion engine according to claim 1, further comprising control means for controlling an injection time of said fuel injection means in response to an engine load.

9. An internal combustion engine according to claim 8, wherein said fuel injection means comprises a single fuel injector, and said control means controls the injection time of said fuel injector to inject fuel toward the bottom wall of said depression when the engine is operating under a light load and to advance the injection time and inject fuel on the top face of said piston when the engine is operating under a heavy load.

10. An internal combustion engine according to claim 9, wherein said control means controls the injection time of said fuel injector to carry out a first fuel injection and a second fuel injection which is later than said first fuel injection when the engine is operating under a middle load, fuel being injected by said fuel injector on the top face of said piston at the time of said first fuel injection, and fuel being injected by said fuel injector toward the bottom wall of said depression at the time of said second fuel injection.

11. An internal combustion engine according to claim 8, wherein said fuel injection means comprises a first fuel injector and a second fuel injector, and said control means controls said first fuel injector and said second fuel injector to inject fuel by said first fuel injector toward the bottom wall of said depression when the engine is operating under a light load and to advance the injection time and inject fuel by both said first fuel injector and said second fuel injector on the top face of said piston when the engine is operating under a heavy load.

12. An internal combustion engine according to claim 11, wherein said control means controls the injection time of said first fuel injector and said second fuel injector to carry out a first fuel injection and a second fuel injection which is later than said first fuel injection when the engine is operating under a middle load, fuel being injected by said second fuel injector on the top face of said piston at the time of said first fuel injection, and fuel being injected by said first fuel injector toward the bottom wall of said depression at the time of said second fuel injection.

13. An internal combustion engine according to claim 1, further comprising: a pair of intake valves arranged on the inner wall of said cylinder head; exhaust valve means arranged on the inner wall of said cylinder head;

and a pair of masking walls each being formed on the inner wall of said cylinder head and arranged between said corresponding intake valve and said exhaust valve means to mask a valve opening formed between a valve seat and a peripheral portion of said corresponding intake valve, which is located on said exhaust valve means side, for the entire time for which said corresponding intake valve is open.

14. An internal combustion engine according to claim 13, wherein each of said masking walls is arranged close to peripheral portion of said corresponding intake valve, which is located on said exhaust valve means side, and extends downward, toward said piston to a position lower than said corresponding intake valve when said corresponding intake valve is in the maximum lift position thereof.

15. An internal combustion engine according to claim 14, wherein each of said masking walls extends in an arc along the peripheral portion of said corresponding intake valve.

16. An internal combustion engine according to claim 13, wherein said exhaust valve means comprises three exhaust valves.

* * * * *